(12) United States Patent  
Ahn et al.

(10) Patent No.: US 7,305,157 B2
(45) Date of Patent: Dec. 4, 2007

(54) VERTICALLY-INTEGRATED WAVEGUIDE PHOTODETECTOR APPARATUS AND RELATED COUPLING METHODS

(75) Inventors: Donghwan Ahn, Cambridge, MA (US); Jifeng Liu, Cambridge, MA (US); Jurgen Michel, Arlington, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/269,355

(22) Filed: Nov. 8, 2005

(65) Prior Publication Data

US 2007/0104411 A1 May 10, 2007

(51) Int. Cl.
    *G02B 6/12* (2006.01)
(52) U.S. Cl. .......................................... 385/14; 385/49
(58) Field of Classification Search ............... None
    See application file for complete search history.

(56) References Cited

U.S. PATENT DOCUMENTS

| | | | |
|---|---|---|---|
| 6,437,891 B1 * | 8/2002 | Chandrasekhar et al. | ... 398/139 |
| 6,537,370 B1 | 3/2003 | Hernandez | |
| 6,635,110 B1 | 10/2003 | Luan | |
| 6,825,542 B2 * | 11/2004 | Lam et al. ................... | 257/466 |
| 2004/0052445 A1 | 3/2004 | Forrest et al. | |
| 2004/0188794 A1 | 9/2004 | Gothoskar et al. | |
| 2005/0053319 A1 * | 3/2005 | Doan .......................... | 385/14 |

OTHER PUBLICATIONS

Brunner et al., "Molecular beam epitaxy growth and thermal stability of $Si_{1-x}Ge_x$ layers on extremely thin silicon-on-insulator substrates," *Thin Solid Films*, Elsevier Science S.A., vol. 321 (1998), pp. 245-250.
Giovane "Strain-Balanced Silicon-Germanium Materials for Near IR Photodetection in Silicon-Based Optical Interconnects" (Ph. D. Thesis, MIT, 1998).
Jutzi et al., "Ge-on-Si Pin-Photodiodes for Vertical and In-Plane Detection of 1300 to 1580 nm Light", Solid-State Device Research Conference, 2004, IEEE (2004) pp. 345-348.
Luan et al., Proceedings of SPIE, "Materials processing technology for the integration of effective Ge p-i-n photodetectors on Si for Si microphotonics," vol. 4293, pp. 118-122 (2001).
Rouviere et al., "Integration of Germanium Waveguide Photodetectors for Optical Intra-Chp Interconnects" (Proceedings of SPIE. vol. 5453, 2004).
Yoshimoto, T. et al., "SOI Waveguide GeSi Avalanche Pin Photodetector at 1.3 μm Wavelength ", IEICE Trans. Electron., vol. E81-C, No. 10 (Oct. 1998), pp. 1667-1669.
International Search Report for Application No. PCT/US2006/020935 dated Aug. 30, 2006 (6 pages).
Patent Abstracts of Japan, Publication No. 2003/12053, Published Nov. 7, 2000 (1 page).

* cited by examiner

*Primary Examiner*—Tim M. Wong
(74) *Attorney, Agent, or Firm*—Goodwin Procter LLP

(57) ABSTRACT

High-speed optoelectronic devices having a waveguide densely integrated with and efficiently coupled to a photodetector are fabricated utilizing methods generally compatible with CMOS processing techniques. In various implementations, the waveguide consists essentially of single-crystal silicon and the photodetector contains, or consists essentially of, epitaxially grown germanium or a silicon-germanium alloy having a germanium concentration exceeding about 90%.

20 Claims, 8 Drawing Sheets

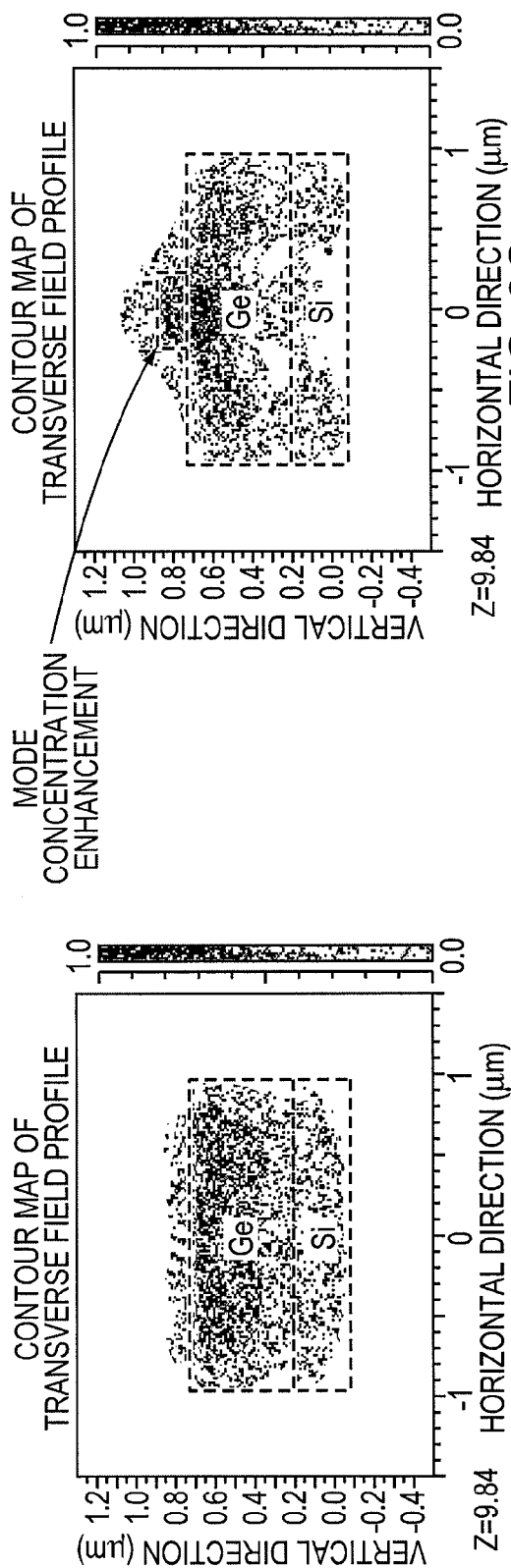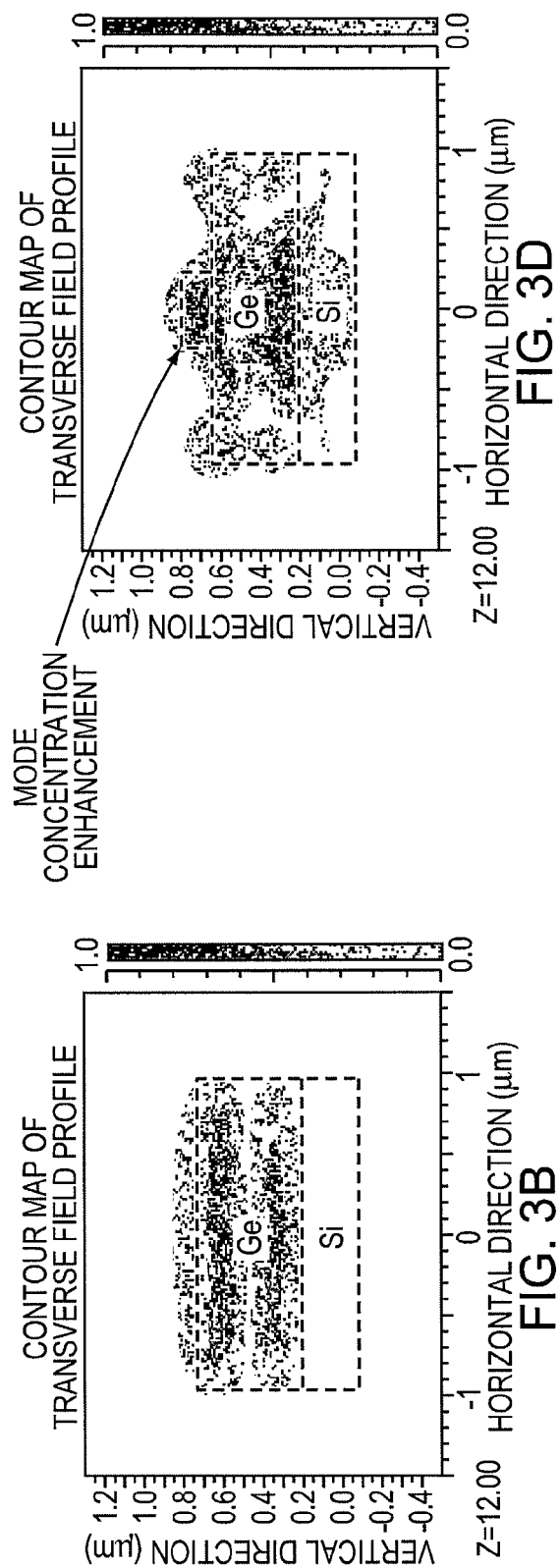

VERTICALLY-INTEGRATED WAVEGUIDE PHOTODETECTOR APPARATUS AND RELATED COUPLING METHODS

FIELD OF THE INVENTION

This invention relates generally to optoelectronic devices and, specifically, to methods and materials for fabrication of waveguide-based photodetector devices.

BACKGROUND OF THE INVENTION

Photodetectors are essential for many optical applications, for example, qualitative and quantitative light intensity measurements, image recognition, video and picture acquisition, and spectral measurements. The basic principle of any photodetector is that it converts light into electricity, and typically (though not always) the current response is measured.

Various optoelectronic applications, such as optical telecommunications and intra-chip interconnects, involve transmitting optical signals and converting them to electrical signals at high data rates. Systems for performing such transmission and conversion usually require photodetector devices compatible with the speed and bandwidth of the optical signal. Typically, these devices are PIN detectors—i.e. semiconductor devices including an intrinsic region sandwiched between a p-type region and an n-type region—that have frequency response in the GHz range and utilize optical waveguides as a conduit for directing light to the intrinsic region of the photodetector.

Generally, an optical waveguide is a planar, rectangular, or cylindrical structure having a high-index core surrounded by a low-index cladding. Light rays are predominantly confined in the core by internal reflection at the core/cladding interface, with a small portion of the light propagating in the cladding as an evanescent wave. In order to form a high-speed waveguide-based photodetector, a lightwave traveling in the optical waveguide is coupled to the intrinsic region of the photodetector, where the light is converted to photon-generated carriers. The carriers then diffuse out to the electrodes, e.g. the p- and n-type regions of the PIN detector, producing an electrical signal (e.g., a photocurrent) that corresponds to the detected light. To reduce scattering and improve detection efficiency, the intrinsic region of a PIN photodetector should be in direct contact with or sufficiently close to either a waveguide's butt end or to its surface. In the latter case, light can be coupled to the intrinsic region via the evanescent wave, a phenomenon referred to as "evanescent coupling."

The speed of the detector generally depends on the time it takes for the photon-generated carriers to reach the electrodes, i.e. the time span that passes between the absorption of a photon and the appearance of the associated current at the electrodes. This time is referred to as the "transit time." The narrower the intrinsic region, the shorter the transit time and the faster the detector. A fast photodetector allows for the detection and processing of high-speed optical signals.

As mentioned above, one potential application of such integrated photodetector devices relates to optical intra-chip interconnects. Recently, the increasing computing power of modern microelectronic devices has given rise to the need for smaller transistors and increased operating speeds that translate to higher density metallic interconnect lines carrying more current. The smaller cross-sectional dimensions of interconnects, however, generally lead to resistance-capacitance time delays and electromigration failure issues. Furthermore, the clock distribution typically consumes as much as 70% of the total power dissipated on a chip. Thus, conventional interconnects may impede further developments in microelectronic technology. In that regard, integrated photodetector devices present a promising alternative to the metallic interconnects, enabling novel microprocessor architectures by permitting significant increases in the intra- and inter-chip data transfer rates and reducing power consumption.

Implementation of these integrated photodetectors as optical interconnects for microelectronic devices, however, presents a number of challenges because different fabrication techniques are typically employed for microelectronic and optical components. Thus, it is desirable to incorporate the optical components onto a chip without jeopardizing CMOS processing compatibility or interfering with the operation of CMOS devices. In that regard, silicon-on-insulator ("SOI") substrates, commonly used in CMOS fabrication, are particularly attractive for incorporating optical components with microelectronic devices. Specifically, using SOI as a starting substrate, low-loss waveguides can be defined in the top silicon layer. The high refractive index contrast between silicon and its oxide enables high light confinement in microscale strip waveguides. With respect to the photodetector, however, many applications having optical components that operate at wavelengths longer than silicon's absorption edge (1.3 $\mu$m to 1.54 $\mu$m) require an active material other than pure silicon to achieve acceptable absorption levels and generate photocurrent. Bulk germanium and/or silicon-germanium compounds have been previously proposed as suitable candidates for the photodetector material in silicon-based integrated waveguide photodetectors. See, for example, "Integration of Germanium Waveguide Photodetectors for Optical Intra-Chip Interconnects" by Rouviére et al. (Proceedings of SPIE, vol. 5453, 2004) and "Strain-Balanced Silicon-Germanium Materials for Near IR Photodetection in Silicon-Based Optical Interconnects" by Giovane (Ph.D. Thesis, MIT, 1998), both incorporated herein by reference.

Known approaches for integrating germanium-based photodetectors with silicon-based waveguides, however, suffer from several process- and performance-related drawbacks, including poor confinement and coupling efficiency, suboptimal integration density, and complexity of fabrication.

Thus, there is a need in the art for versatile and cost-effective methods of fabricating integrated waveguide-based photodetector devices that are generally compatible with CMOS processing techniques. There is also a need in the art for integrated high-speed waveguide-based photodetector device with improved detection capabilities and integration density.

SUMMARY OF THE INVENTION

Heterointegration of lattice-mismatched materials is desirable for various electronic and optoelectronic applications. For example, as mentioned above, the possibility of the heterointegration of III-V, II-VI materials, and/or Ge with Si is an attractive path for fabricating integrated devices transmitting optical signals and converting them to electrical signals at high data rates.

Accordingly, it is an object of the present invention to provide optoelectronic devices that address both process- and performance-related limitations of known approaches. Generally, in its various aspects and embodiments, the invention disclosed herein focuses on optoelectronic devices having a waveguide densely integrated with and efficiently coupled to a photodetector, as well as on optoelectronic circuits employing such devices. The invention also features methods for fabricating such integrated devices preferably being generally compatible with CMOS processing techniques.

In general, in one aspect, the invention features an integrated photodetector apparatus that includes a substrate having a first cladding layer disposed over a base layer. The apparatus also includes an optical waveguide having a first portion and a second portion and disposed over the substrate. The base layer and the optical waveguide contain, or consist essentially of, a first semiconductor material. The apparatus further includes a photodetector comprising (i) a source region and a drain region separated by an intrinsic region and (ii) a second semiconductor material epitaxially grown over the optical waveguide. The intrinsic region of the photodetector is evanescently coupled to the second portion of the optical waveguide. Also included is an auxiliary semiconductor region disposed at least partially over the intrinsic region for increasing photocarrier concentration therein.

In this and other aspects of the invention, the first semiconductor material may contain, or consist essentially of, single-crystal silicon. Also, the first cladding layer may contain, or consist essentially of, silicon dioxide. The photodetector may contain, or consist essentially of, germanium or a silicon-germanium alloy having a germanium concentration exceeding about 90%. The auxiliary semiconductor region may contain, or consist essentially of, silicon, germanium, or a silicon-germanium alloy.

Also, this and other aspects of the invention include the following features. The photodetector apparatus may also include (i) contact regions in electrical communication with the source and the drain regions and/or (ii) a second cladding layer disposed over the optical waveguide and the photodetector. The second cladding layer may contain, or consist essentially of, silicon dioxide.

Further, in many embodiments of this and other aspects of the invention, the thickness of the photodetector does not exceed about 1.5 µm. Also, in some embodiments, (i) a width of the second portion exceeds a width of the first portion; and (ii) the optical waveguide includes a tapered portion disposed between the first and the second portion. A width of the tapered portion continuously increases from the first portion towards the second portion. In various embodiments, the waveguide is a single-mode structure. In some versions of these embodiments, the thickness of the optical waveguide is less than about 1 µm, for example, is about 0.2 µm. Also, in these or other versions, a width of the first portion is less than about 1 µm, or, in a particular version, is about 0.5 µm. A width of the second portion ranges from about 1 µm to about 10 µm, for example, is between about 1 µm and about 4 µm, or, in a particular version, is between about 1.2 µm and about 2 µm.

Generally, in another aspect, the invention focuses on an integrated photodetector apparatus that includes a substrate having a first cladding layer disposed over a base layer and, thereover, an optical waveguide. The optical waveguide includes a first portion, a second portion, and a first doped region formed in the second portion. The base layer and the optical waveguide contain, or consist essentially of, a first semiconductor material. The apparatus further includes (i) a second semiconductor material epitaxially grown over at least partially over the first doped region and (ii) an intrinsic region evanescently coupled to the second portion of the optical waveguide.

In some embodiments, the photodetector apparatus includes a cap layer disposed at least partially over the intrinsic region of the photodetector. The cap layer has a second doped region formed therein and contains, or consists essentially of, a third semiconductor material. In other embodiments, a second doped region is formed in the second semiconductor material of the photodetector over the intrinsic region. In various embodiments of this and other aspects of the invention, one of the doped regions includes a source region and the other doped region includes a drain region.

Also, in two further aspects, the invention relates to an optoelectronic circuit that includes an integrated photodetector apparatus, a light source, and an electronic device. In particular, in one aspect, the photodetector apparatus includes (i) an optical waveguide disposed over a substrate including a first cladding layer disposed over a base layer, (ii) a photodetector having a source region and a drain region separated by an intrinsic region evanescently coupled to a portion of the optical waveguide; and (iii) an auxiliary semiconductor region disposed at least partially over the intrinsic region for increasing photocarrier concentration therein. The optical waveguide and the base layer contain, or consist essentially of, single-crystal silicon. The photodetector layer contains, or consists essentially of, a semiconductor material epitaxially grown over the optical waveguide. Also, the auxiliary region contains, or consists essentially of, silicon, germanium, or a silicon-germanium alloy. In another aspect, the photodetector apparatus includes an optical waveguide having a first portion, a second portion, and a first doped region formed in the second portion. The optical waveguide is disposed over a substrate including a first cladding layer disposed over a base layer. The apparatus further includes a photodetector having a second doped region and an intrinsic region disposed thereunder and evanescently coupled to the second portion of the optical waveguide. One of the doped regions includes a source region and the other doped region includes a drain region. The optical waveguide and the base layer contain, or consist essentially of, single-crystal silicon. The photodetector layer contains, or consists essentially of, a semiconductor material epitaxially grown over the optical waveguide at least partially over the first doped region.

Within the optoelectronic circuits according to both aspects described above, the light source is in optical communication with an input end of the optical waveguide for directing a lightwave thereto, and the electronic device is electrically coupled to the source and drain regions for receiving and processing an electrical signal generated in the photodetector.

In yet another two aspects, in general, the invention relates to methods for manufacturing an integrated photodetector apparatus. In one aspect, the method includes providing a silicon-on-insulator substrate having a top layer that contains, or consists essentially of, single-crystal silicon and then epitaxially growing a lattice-mismatched semiconductor layer over the top layer of the substrate. The method further includes removing a portion of the lattice-mismatched semiconductor layer and a portion of the top layer to form an optical waveguide and a photodetector disposed thereover. The photodetector has an intrinsic region evanescently coupled to the optical waveguide. The method also includes epitaxially growing an auxiliary semiconductor region over the intrinsic region for increasing photocarrier concentration therein; and forming a source region and a drain region in the photodetector. In another aspect, the method includes providing a silicon-on-insulator substrate having a top layer that contains, or consists essentially of, single-crystal silicon and forming a first doped region in the top layer. The method further includes epitaxially growing a lattice-mismatched semiconductor layer over the top layer of the substrate and at least partially over the first doped region; and then removing a portion of the lattice-mismatched semiconductor layer and a portion of the top layer to form an optical waveguide and a photodetector disposed over the optical waveguide and evanescently coupled thereto. Optionally, a cap layer containing, or consisting essentially of, silicon is deposited over the lattice-mismatched semiconductor layer.

Embodiments of either of these two aspects of the invention include the following features. A cladding layer that contains, or consists essentially of, silicon dioxide may be deposited over the optical waveguide and the photodetector. A second doped region can be formed either in the photodetector or in the cap layer, one of the doped regions including a source region and the other doped region including a drain region, and then contact regions electrically coupled to the source and drain regions can be formed. The lattice-mismatched semiconductor layer may contain, or consist essentially of, germanium or a silicon-germanium alloy having a germanium concentration exceeding about 90%.

Optionally, the step of epitaxially growing the lattice-mismatched semiconductor layer includes (i) depositing a semiconductor material over the top layer at a first temperature to form a buffer layer; and (ii) depositing the semiconductor material over the buffer layer at a second temperature until a final thickness is obtained. A thickness of the buffer layer may range from about 30 nm to about 60 nm. In various embodiments, the final thickness does not exceed about 1.5 μm. Also, the second temperature can be greater than the first temperature. The step of epitaxially growing the lattice-mismatched semiconductor layer may further include annealing the semiconductor material, for example, at a temperature greater than about 850° C. for at least 15 minutes, or by rapid thermal annealing at a temperature greater than about 850° C. for about 3 minutes.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 3A-3B depict optical simulations of transverse field profiles for one embodiment of the integrated device of FIGS. 2A-2E, FIGS. 3C-3D depict optical simulations of transverse field profile for another embodiment of the integrated device of FIGS. 2A-2E.

DETAILED DESCRIPTION

In accordance with its various embodiments, the invention disclosed herein contemplates fabrication of integrated waveguide-based photodetector apparatus with improved detection capabilities and integration density utilizing methods that are generally compatible with CMOS processing techniques. Also contemplated are optoelectronic circuits including at least one integrated photodetector apparatus, a light source for directing a lightwave thereto, and one or more electronic devices for receiving and processing an electrical signal generated in the photodetector apparatus.

As discussed in more detail below, efficient evanescent coupling between components in the integrated apparatus of the invention is facilitated by epitaxially growing a photodetector over a portion of an optical waveguide. Epitaxial deposition is suitable for fabricating optoelectronic devices according to many embodiments of the invention because it is only marginally, if at all, disruptive to a conventional CMOS process performed on the same wafer, and, therefore, is particularly attractive for incorporating optical components with microelectronic devices.

While generally described in connection with germanium or silicon-germanium photodetectors integrated with silicon or silicon-based optical waveguides employing silicon and SOI wafers as starting substrates, the invention is not thusly limited and other materials and starting substrates are contemplated without departing from the scope or spirit of the invention. A choice of suitable materials depends, in part, on the range of electromagnetic wavelengths for a particular application and desired performance parameters.

Figure 1A:
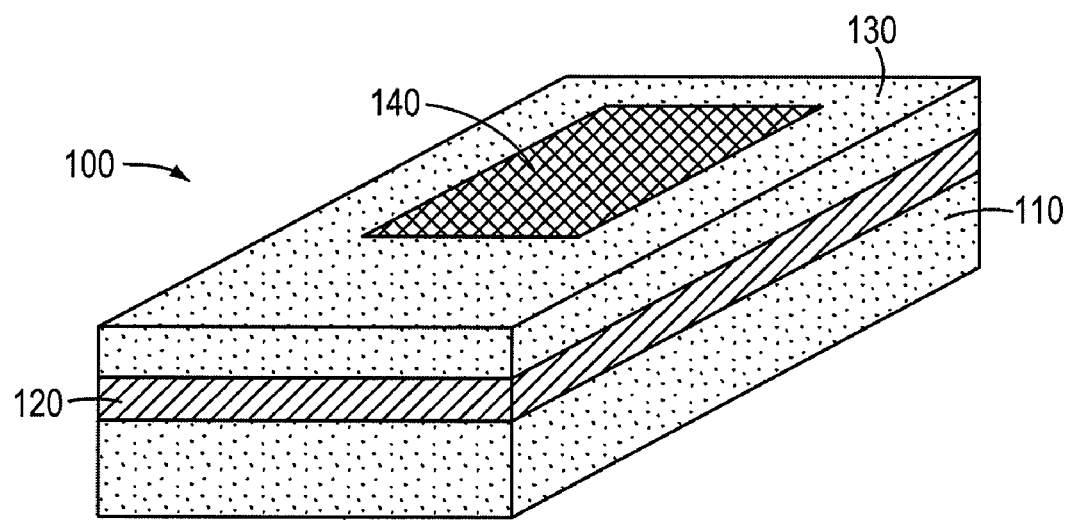
FIGS. 1A-1F and 2A-2E depict schematic perspective and cross-sectional side and/or transverse views illustrating formation of integrated waveguide-based photodetector devices according to various embodiments of the claimed invention.

Referring to FIG. 1A, in various embodiments, fabrication of the waveguide-based photodetector apparatus starts with a substrate 100 including a base semiconductor layer 110 and an insulator layer 120 disposed thereon. The insulator layer will ultimately serve as a bottom cladding layer of the waveguide. A top semiconductor layer 130 is disposed over the insulator layer. In a particular embodiment, the substrate 100 is a SOI wafer such that the top and the base semiconductor layers consist essentially of single-crystal silicon and the insulator layer consists essentially of silicon dioxide. An area designated for formation of a first doped region 140 is then defined in a portion of the top layer by any of the methods known in the art. For example, in many embodiments, a patterned layer of photoresist material (not shown), acting as a mask for the subsequent ion implantation processing, is disposed over the top layer, leaving a predetermined portion thereof designated for formation of the first doped region exposed. The first doped region 140 is then formed by dopant implantation. Examples of suitable dopants are n-type dopants such as phosphorus, arsenic, and antimony, or a p-type dopant, such as boron. Dopants may be implanted by directing a dopant-containing gas, such as phosphine, arsine, stibine, and/or diborane at the exposed portion of the top layer. The dopant gas is typically diluted in a carrier gas to, for example, approximately 1% concentration.

Figure 1B:
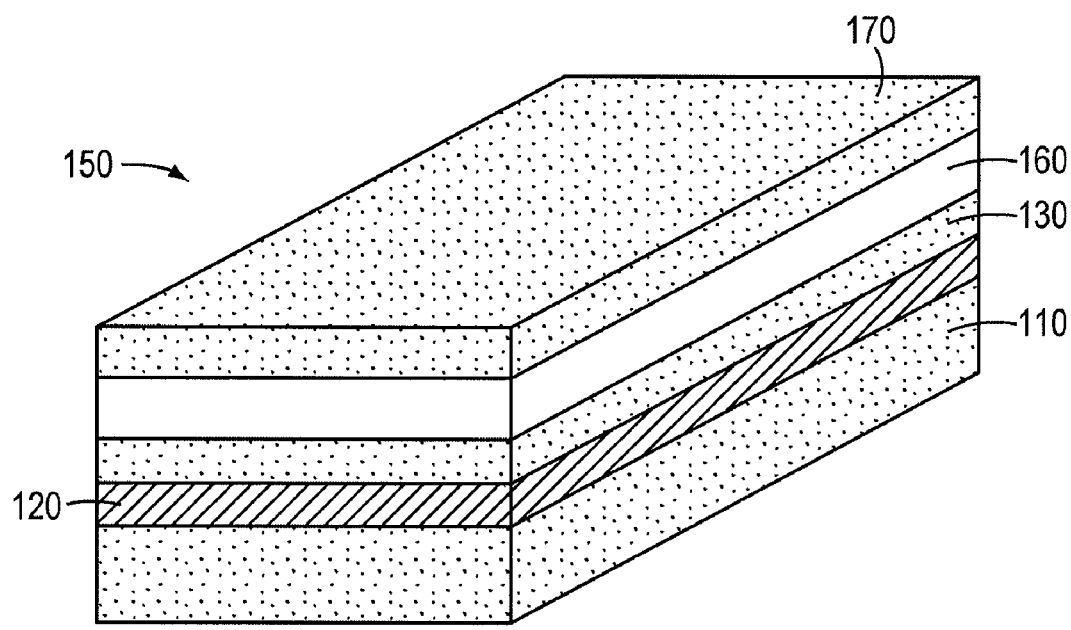

Referring now to FIG. 1B, after the photoresist material is removed, an intermediate heterostructure 150 is formed by epitaxially depositing a layer 160 over the top semiconductor layer 130 at least partially over the first doped region 140. The layer 160 contains, or consists essentially of, a lattice-mismatched semiconductor material. The lattice-mismatched semiconductor material is selected depending, in part, on the desired optical absorption properties for a given wavelength. In various embodiments, the lattice-mismatched semiconductor material is bulk germanium or a silicon-germanium alloy having a germanium concentration exceeding about 90%. As skilled artisans will readily recognize, for typical wavelengths used in optoelectronic applications, the optical absorption coefficient of bulk germanium disposed over silicon substrate is very high—e.g. about 9,000 cm$^{-1}$ for a wavelength of about 1.3 μm and between 2,000 and 4,000 cm$^{-1}$ for a wavelength of about 1.55 μm.

The lattice mismatch—i.e. the difference in crystalline lattice sizes between the top semiconductor layer 130 and the layer 160—creates stress during material deposition that generates dislocation defects in the resulting heterostructure. In order to improve the quality of the lattice-mismatched material of the layer 160, in various embodiments of the invention, multi-step epitaxial growth methods, such those described in, for example, U.S. Pat. Nos. 6,537,370 and 6,635,110, as well as in "Materials processing technology for the integration of effective Ge p-i-n photodetectors on Si for Si microphotonics," Proceedings of SPIE," vol. 4293, pgs. 118-122 (2001), all incorporated herein by reference, are employed. Specifically, in a particular embodiment, the epitaxial growth of the germanium layer 160 over the silicon layer 130 of the SOI wafer 100 is carried out in two steps in an ultra-high vacuum chemical vapor deposition (UH-VCVD) system. First, a thin (i.e. having a thickness ranging from about 30 nm to about 60 nm) substantially relaxed germanium buffer layer is epitaxial grown at a temperature of about 350° C. in order to plastically relax the strain therein without formation of undesirable dislocation pile-ups. Then, the epitaxial growth continues at higher temperatures, e.g. about 600° C., until a desired final thickness of the layer 160 is obtained. In many embodiments, the final thickness of the layer 160 does not exceed about 1.5 μm.

In some embodiments, in order to further improve the quality of the layer 160 by facilitating removal of threading dislocations towards the edges of the heterostructure, the multi-step epitaxial growth may be supplemented by annealing the lattice-mismatched semiconductor material, for example, at a temperature of about 850° C.-900° C. for at least 15 minutes, or by rapid thermal annealing at a temperature greater than about 850° C. for about 3 minutes. Another suitable post-deposition method includes thermal cycling between 780° C. and 900° C. (10 minutes at each temperature).

Optionally, a semiconductor cap layer 170, for example, containing, or consisting essentially of, poly-silicon can be uniformly deposited over the layer 160, for example, over its entire surface.

Figure 1C:
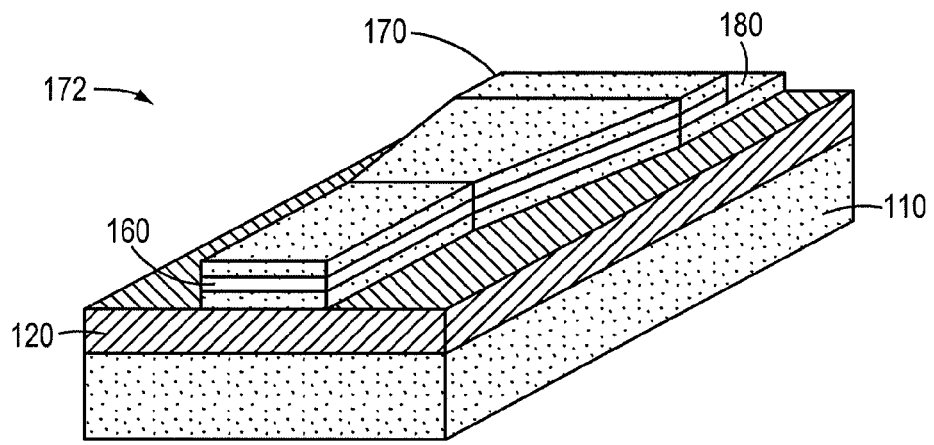
Figure 1D:
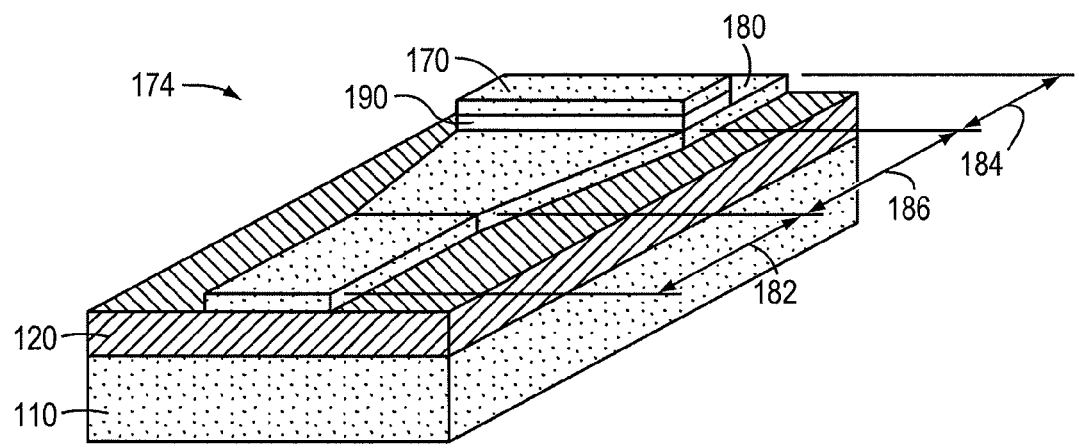

Referring to FIGS. 1C-1D, intermediate structures 172, 174 are then fabricated from the heterostructure 150 by removing portions of layers 130 and 160, as well as the optional cap layer 170, if present, to first define a waveguide 180 in the layer 130 (FIG. 1C) and then define a photodetector 190 disposed over the waveguide. In various embodiments of the invention, the removal is accomplished by patterning the desired configuration of the waveguide and the photodetector using photoresist and then dry and/or wet etching through the layers 130, 160, and 170.

To improve detection capabilities and integration density, in many embodiments, the waveguide 180 includes a narrow portion 182, a wide portion 184, and an intermediate tapered portion 186 disposed therebetween. The portion 184 is generally disposed underneath the photodetector 190. Width of the tapered portion continuously increases from the first portion towards the second portion. Also, in various embodiments, the waveguide is a single-mode structure, i.e. a structure in which only the lowest-order bound mode can propagate at a given wavelength. Generally, the lowest-order bound mode is ascertained for the given wavelength by solving Maxwell's equations for the boundary conditions imposed by the waveguide, e.g., core (spot) size and the refractive indices of the core and cladding. Thus, keeping in mind that the range of wavelengths typically used in opto-electronic applications is 1.3-1.55 μm, in some versions of these embodiments, the thickness of the optical waveguide is less than about 1 μm, for example, is about 0.2 μm. Also, in these or other versions, a width of the first portion is less than about 1 μm, or, in a particular version, is about 0.5 μm. A width of the second portion ranges from about 1 μm to about 10 μm, for example, is between about 1 μm and about 4 μm, or, in a particular embodiment, is between 1.2 μm and 2 μm.

Figure 1E:
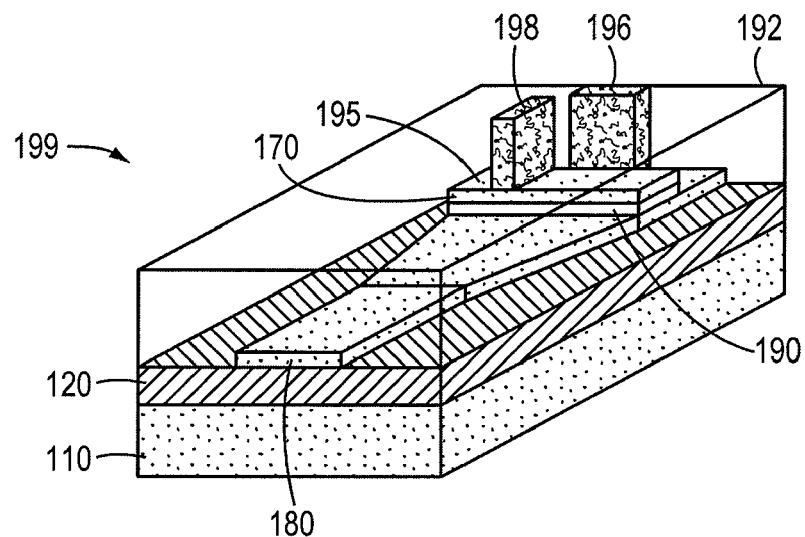
Figure 1F:
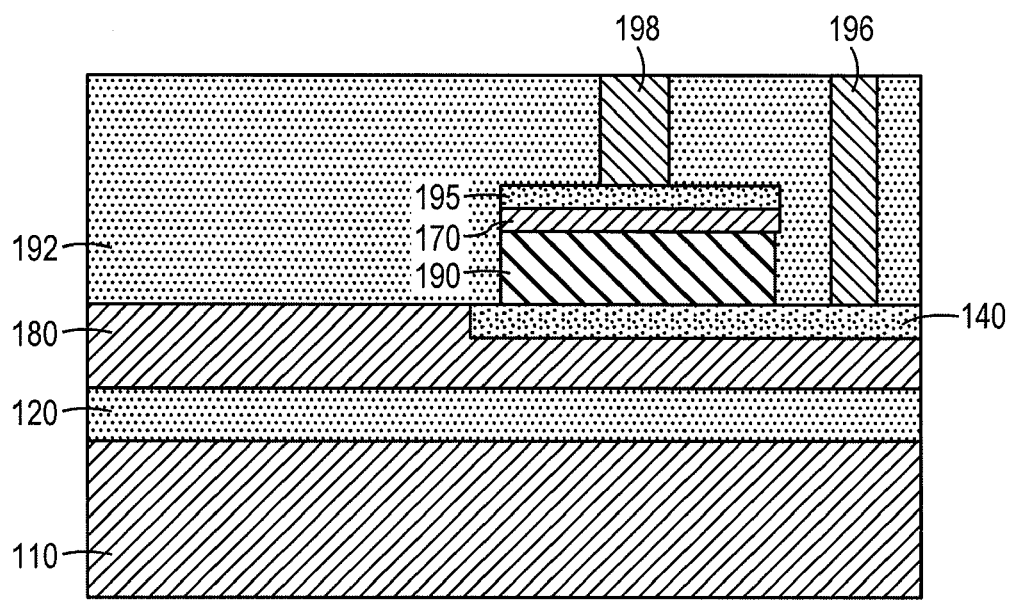

Referring now to FIGS. 1E-1F, in various embodiments, a top cladding layer 192 (depicted as transparent in FIG. 1E for illustration purposes) is deposited over the waveguide 180 and the photodetector 190 (or the cap layer 170) by, for example, any of conventional chemical vapor deposition techniques. In many embodiments, the top cladding layer contains, or consists essentially of, silicon dioxide or silicon oxynitride.

The interface between the photodetector 190 formed, in some embodiments, of germanium or a silicon-germanium alloy with high germanium content and the top cladding layer formed of silicon dioxide or silicon oxynitride facilitates confinement of photocarriers within the intrinsic region of the photodetector, such that substantially all unabsorbed light is back-reflected at the interface. As a result, unabsorbed photocarriers travel vertically through the photodetector between the waveguide and the top cladding layer until fully absorbed. This phenomenon, in turn, enables desirable detection capabilities of the photodetector while employing relatively thin layers of the absorbing material, thereby enhancing the detection speed. As mentioned above, in various embodiments, a thickness of the photodetector is less than about 1.5 μm, for example, is about 1 μm.

Following the deposition of the top cladding layer, a portion thereof over the photodetector 190 is removed, for example, by etching, such that a portion of the top surface of the photodetector (or, in some embodiments, the cap layer) is exposed, and then a second doped region 195 is formed in that portion by, for example, ion implantation. As mentioned above, examples of suitable dopants are n-type dopants such as phosphorus, arsenic, and antimony, or a p-type dopant, such as boron. Dopants may be implanted using a dopant gas, such as phosphine, arsine, stibine, and/or diborane. The opening in the layer 192 over the second doped region is then filled by the cladding material, such as, for example, silicon dioxide or silicon oxynitride. In various embodiments of the invention, one of the doped regions includes a source region and the other doped region includes a drain region of the photodetector apparatus having PIN configuration. Further, contact regions 196, 198 are formed to provide electrical communication with the source and drain regions employing methods known in the art. For example, contact holes are defined through the layer 192 over a portion of the regions 140, 195, and then filled with a contact material. In a particular embodiment, the contact material is a metal compound that is thermally stable and has low electrical resistivity at the semiconductor/refractory metal interface, such as a metal germanicide and/or metal silicide including, for example, cobalt, titanium, tungsten, molybdenum, platinum, nickel, or tantalum. Preferably, the contact regions are formed by a self-aligned process, in which the contacts are formed only in the areas where the deposited metal is in direct contact with the source/drain regions. As a result, an integrated waveguide-based photodetector apparatus 199 employing a vertical PIN configuration is fabricated. Because of the compact coupling and design configuration of the components, integration density and detection speed and sensitivity are generally enhanced.

Figure 2A:
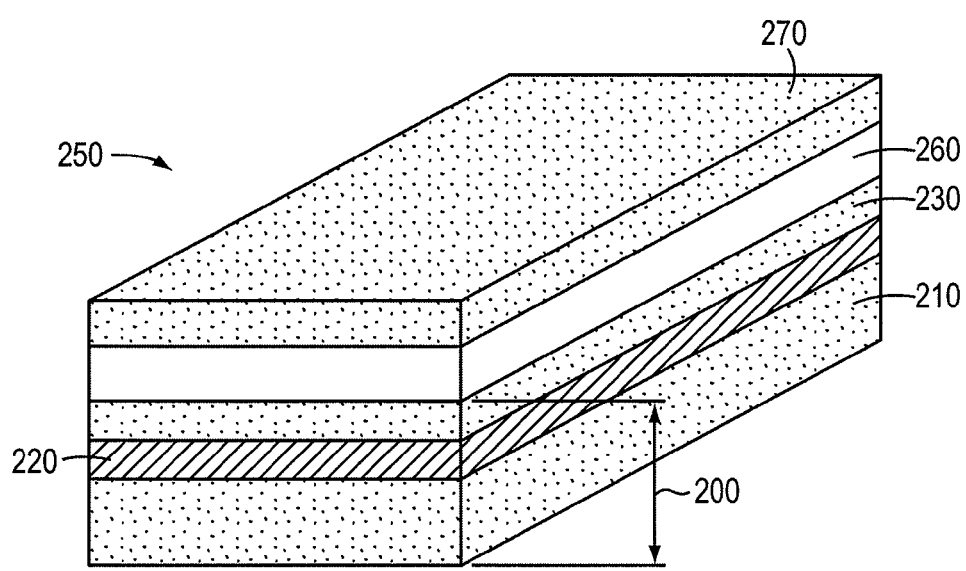

Referring to FIG. 2A, in some embodiments, fabrication of the waveguide-based photodetector apparatus having a lateral PIN configuration starts with a substrate 200 including a base semiconductor layer 210 and an insulator layer 220 disposed thereon, similar to the embodiments described above in connection with FIG. 1A. The insulator layer will ultimately serve as a bottom cladding layer of the waveguide. A top semiconductor layer 230 is disposed over the insulator layer. In a particular embodiment, the substrate 200 is a SOI wafer such that the top and the base semiconductor layers consist essentially of single-crystal silicon and the insulator layer consists essentially of silicon dioxide. An intermediate heterostructure 250 is then formed by epitaxially depositing a layer 260 over the top semiconductor layer 230. The layer 260 contains, or consists essentially of, a lattice-mismatched semiconductor material.

As described above in connection with FIGS. 1A-1F, the lattice-mismatched semiconductor material is selected depending, in part, on the desired optical absorption properties for a given wavelength. In various embodiments, the lattice-mismatched semiconductor material is bulk germanium or a silicon-germanium alloy having a germanium concentration exceeding about 90%. In order to improve the quality of the lattice-mismatched material of the layer 260, in various embodiments of the invention, multi-step epitaxial growth methods are employed in conjunction with post-deposition annealing, as described above. In many embodiments, the final thickness of the layer 260 does not exceed about 1.5 µm. Also, in many embodiments, an auxiliary semiconductor layer 270, for example, containing, or consisting essentially of, poly-silicon, germanium, or a silicon-germanium alloy is then epitaxially deposited over the layer 260.

Figure 2B:
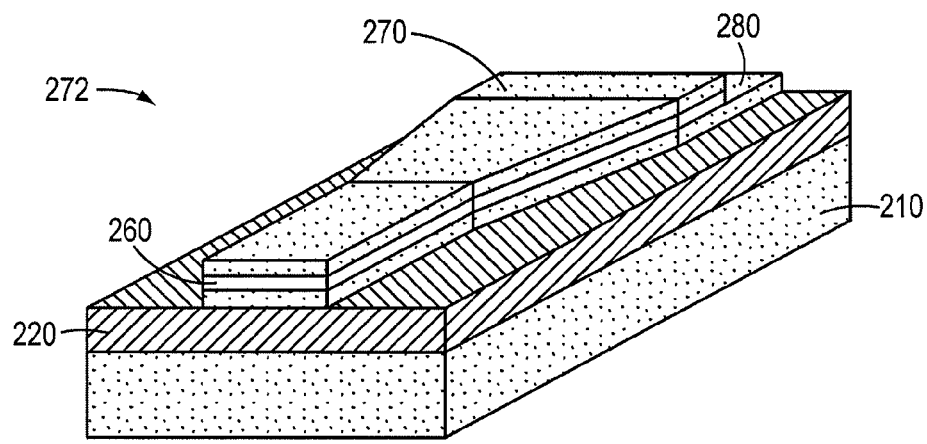
Figure 2C:
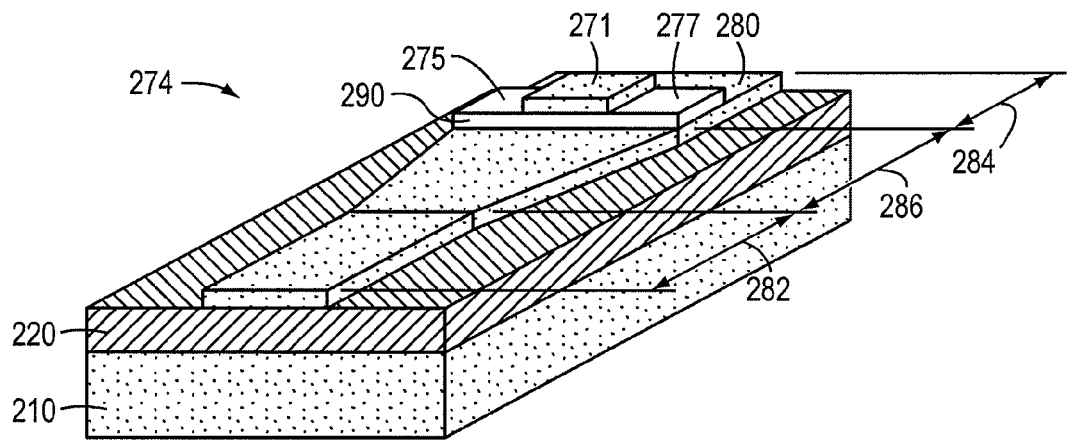
Figure 2D:
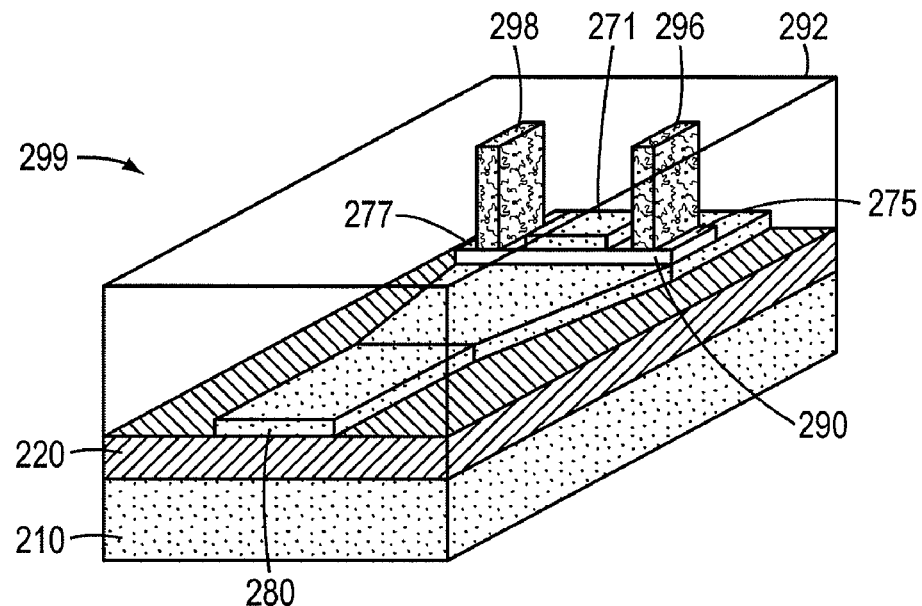

Referring to FIGS. 2B-2C, intermediate structures 272, 274 are fabricated from the heterostructure 250 by removing portions of layers 230, 260, and 270 to first define a waveguide 280 in the layer 230 and then define a photodetector 290 disposed over the waveguide. In some embodiments, portions of the layer 270 are removed as shown in FIG. 2D, such that only portions 275, 277 of the top surface of the photodetector are exposed and a region 271 of the layer 270 remains over the photodetector between the portions 275, 277. In various embodiments of the invention, the removal is accomplished by patterning the desired configuration of the waveguide and the photodetector using photoresist and then dry and/or wet etching through the layers 230, 260, and 270.

Similarly to the embodiments described above with reference to FIGS. 1C-1D, to improve detection capabilities and integration density, in many embodiments, the waveguide 280 includes a narrow portion 282, a wide portion 284, and an intermediate tapered portion 286 disposed therebetween. The portion 284 is generally disposed underneath the photodetector 290. Width of the tapered portion continuously increases from the first portion towards the second portion. Also, in various embodiments, the waveguide is a single-mode structure, and is generally dimensioned, as described above.

Figure 2E:
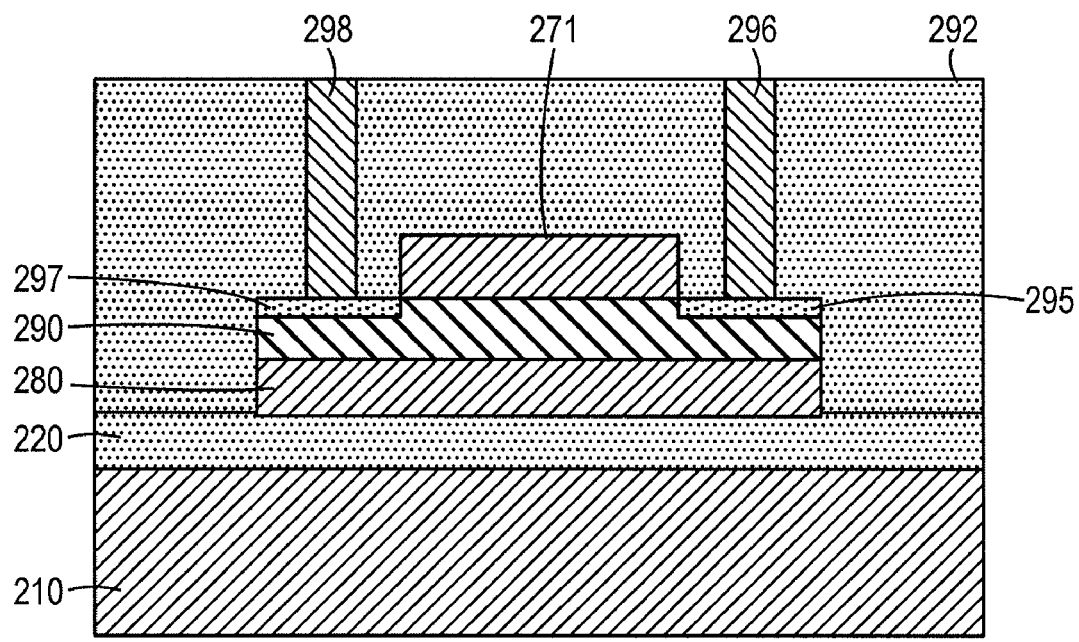

Referring now to FIGS. 2D-2E, in various embodiments, a top cladding layer 292 (depicted as transparent in FIG. 2D for illustration purposes) is deposited over the waveguide 280, the photodetector 290, and the region 271 by, for example, any of conventional chemical vapor deposition techniques. In various embodiments, the top cladding layer contains, or consists essentially of, silicon dioxide or silicon oxynitride.

Following the deposition of the top cladding layer, the cladding material over the portions 275, 277 of the top surface of the photodetector 290 is removed, for example, by etching, such that these portions are exposed, and then a source region 295 and a drain region 297 are formed in those portions, respectively, by, for example, ion implantation. As mentioned above, examples of suitable dopants are n-type dopants such as phosphorus, arsenic, and antimony, or a p-type dopant, such as boron. The dopants are implanted using a dopant gas, such as phosphine, arsine, stibine, and diborane.

As described above, in some embodiments, the intrinsic region of the photodetector is disposed between the source and drain regions generally underneath the region 271. In many embodiments, a refractive index of the region 271 formed of, for example, silicon, germanium or a silicon-germanium alloy, exceeds that of the top cladding layer. Accordingly, the existence of additional high-refractive-index material region 271 over the photodetector causes increased concentration of photocarriers underneath the region 271, for example, in the central portion of the intrinsic region where the electric field is stronger, thereby enhancing the detection speed. Optical simulations illustrating that effect are shown in FIGS. 3A-3D, depicting contour maps of transverse field profile after the photodetector is coupled to the waveguide for the embodiments without the mode-concentration enhancement provided by the region 271 (FIGS. 3A-3B) and with such enhancement (FIGS. 3C-3D).

The openings in the layer 292 over the source and drain regions are filled by the cladding material, such as, for example, silicon dioxide or silicon oxynitride. Further, contact regions 296, 298 are formed to provide electrical communication with the source and drain regions employing methods known in the art, as described above. As a result, an integrated waveguide-based photodetector apparatus 299 employing a lateral PIN configuration is fabricated. Because of the compact coupling and design configuration of the components, integration density and detection speed and sensitivity are generally enhanced.

Figure 4:
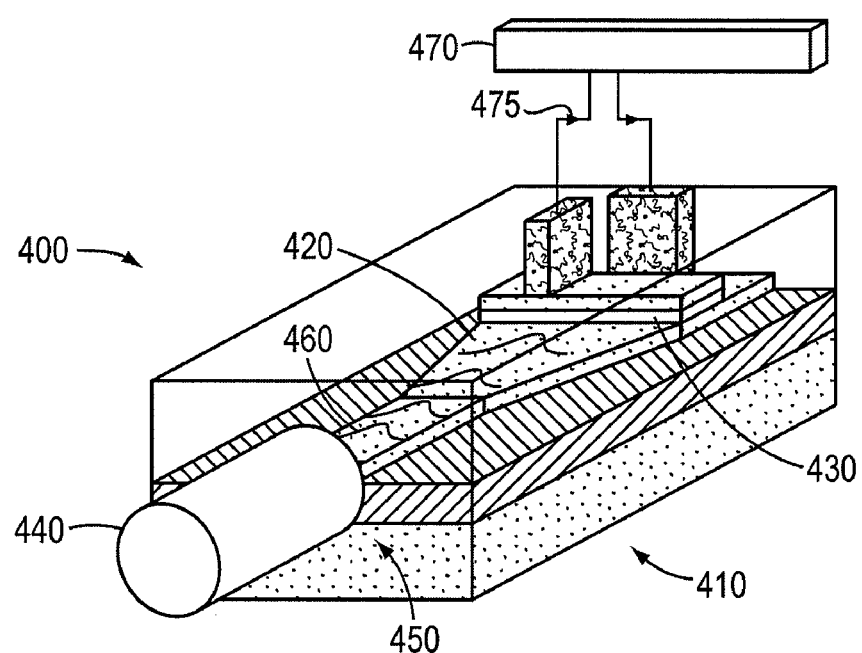
FIG. 4 depicts a perspective view of an optoelectronic circuit utilizing an integrated device formed as illustrated in FIGS. 1A-1F or FIGS. 2A-2E.

Referring to FIG. 4, in many embodiments, an optoelectronic circuit 400 employs an integrated photodetector apparatus 410 implemented according to any of the embodiments of the photodetector apparatus described above. The apparatus 410 includes an optical waveguide 420 evanescently coupled to a photodetector 430. The circuit further includes an optical or optoelectronic device 440 optically coupled to the optical waveguide at its input end 450. The device 440 is capable of generating an optical signal carried by or otherwise represented by lightwave 460. In a particular embodiment, the device 440 includes a microprocessor (not shown) and a light-emitting device (not shown) such as a diode laser or a light-emitting diode. The circuit 400 further includes an electronic or optoelectronic device 470 electrically coupled to the contact regions of the photodetector. The device 470 is any device capable of receiving and processing an electrical signal 475 generated in the photodetector, including, but not limited to, a microprocessor, a filter, an amplifier, or any combination thereof. The device 470 could include or be further connected to any other type of signal-processing element or circuit.

In operation, the device 440 emits an optical signal represented by or carried by the lightwave 460, which is coupled into optical waveguide 420. The lightwave propagates in the waveguide through, e.g., the tapered section 186 and into the section 184 (see FIGS. 1D, 2D), where the lightwave is evanescently coupled into the intrinsic region of the photodetector 430 as the lightwave continues propagating underneath it in the section 184. The light in intrinsic region is converted to photon-generated carriers, which diffuse to contact regions resulting in the electrical signal 475. The electrical signal is then carried to and processed by the device 470.

Other embodiments incorporating the concepts disclosed herein, as well as many modifications, variations, and changes to the embodiments described above, are possible without departing from the spirit of the essential characteristics of the invention or the scope thereof. The foregoing embodiments are therefore to be considered in all respects as only illustrative rather than restrictive of the invention described herein. Therefore, it is intended that the scope of the invention be only limited by the following claims.

The invention claimed is:

1. An integrated photodetector apparatus comprising:
   (a) a substrate comprising a first cladding layer disposed over a base layer, the base layer comprising a first semiconductor material;
   (b) an optical waveguide comprising the first semiconductor material and disposed over the substrate, the optical waveguide comprising a first portion and a second portion;
   (c) a photodetector comprising (i) a source region and a drain region separated by an intrinsic region, the intrinsic region being evanescently coupled to the second portion of the optical waveguide, and (ii) a second semiconductor material epitaxially grown over the optical waveguide; and
   (d) an auxiliary semiconductor region disposed at least partially over the intrinsic region for increasing photocarrier concentration therein.

2. The photodetector apparatus of claim 1 wherein the first semiconductor material comprises single-crystal silicon and the first cladding layer comprises silicon dioxide.

3. The photodetector apparatus of claim 1 wherein the photodetector comprises germanium or a silicon-germanium alloy having a germanium concentration exceeding about 90%.

4. The photodetector apparatus of claim 1 wherein the auxiliary semiconductor region comprises silicon, germanium, or a silicon-germanium alloy.

5. The photodetector apparatus of claim 1, further comprising contact regions in electrical communication with the source and the drain regions.

6. The photodetector apparatus of claim 1 wherein (i) a width of the second portion exceeds a width of the first portion; and (ii) the optical waveguide further comprises a tapered portion disposed between the first and the second portion, a width of the tapered portion continuously increasing from the first portion towards the second portion.

7. The photodetector apparatus of claim 1 wherein the waveguide is a single-mode structure.

8. The photodetector apparatus of claim 7 wherein a thickness of the optical waveguide is less than about 1 µm.

9. The photodetector apparatus of claim 7 wherein a width of the first portion is about 0.5 µm.

10. The photodetector apparatus of claim 7 wherein a width of the second portion ranges from about 1 µm to about 4 µm.

11. The photodetector apparatus of claim 1 wherein a thickness of the photodetector does not exceed about 1.5 µm.

12. The photodetector apparatus of claim 1, further comprising a second cladding layer disposed over the optical waveguide and the photodetector.

13. The photodetector apparatus of claim 12 wherein the second cladding layer comprises silicon dioxide.

14. An integrated photodetector apparatus comprising:
    (a) a substrate comprising a first cladding layer disposed over a base layer, the base layer comprising a first semiconductor material;
    (b) an optical waveguide comprising the first semiconductor material and disposed over the substrate, the optical waveguide comprising a first portion, a second portion, and a first doped region formed in the second portion; and
    (c) a photodetector comprising (i) a second semiconductor material epitaxially grown at least partially over the first doped region; and (ii) an intrinsic region evanescently coupled to the second portion of the optical waveguide.

15. The photodetector apparatus of claim 14 wherein the first semiconductor material comprises single-crystal silicon and the first cladding layer comprises silicon dioxide.

16. The photodetector apparatus of claim 14 wherein the photodetector comprises germanium or a silicon-germanium alloy having a germanium concentration exceeding about 90%.

17. The photodetector apparatus of claim 14, further comprising:
    (a) a cap layer disposed at least partially over the intrinsic region of the photodetector, the cap layer comprising (i) a third semiconductor material; and (ii) a second doped region formed therein, one of the doped regions comprising a source region and the other doped region comprising a drain region; and
    (b) contact regions in electrical communication with the source and the drain regions.

18. The photodetector apparatus of claim 14 wherein the photodetector comprises a second doped region formed in the second semiconductor material over the intrinsic region, one of the doped regions comprising a source region and the other doped region comprising a drain region, the photodetector apparatus further comprising contact regions in electrical communication with the source and the drain regions.

19. An optoelectronic circuit comprising:
    (a) an integrated photodetector apparatus, comprising:
        an optical waveguide disposed over a substrate including a first cladding layer disposed over a base layer, the optical waveguide and the base layer comprising single-crystal silicon,
        a photodetector comprising (i) a source region and a drain region separated by an intrinsic region evanescently coupled to a portion of the optical waveguide, and (ii) a semiconductor material epitaxially grown over the optical waveguide, and
        an auxiliary semiconductor region disposed at least partially over the intrinsic region for increasing photocarrier concentration therein, the auxiliary region comprises silicon, germanium, or a silicon-germanium alloy;
    (b) a light source in optical communication with an input end of the optical waveguide for directing a lightwave thereto; and
    (c) an electronic device electrically coupled to the source and drain regions for receiving and processing an electrical signal generated in the photodetector.

20. An optoelectronic circuit comprising:
    (a) an integrated photodetector apparatus, comprising:
        an optical waveguide disposed over a substrate including a first cladding layer disposed over a base layer, the optical waveguide and the base layer comprising single-crystal silicon, the optical waveguide comprising a first portion, a second portion, and a first doped region formed in the second portion, and a photodetector comprising (i) a second doped region and an intrinsic region disposed thereunder, the intrinsic region being evanescently coupled to the second portion of the optical waveguide, and (ii) a semiconductor material epitaxially deposited over the optical waveguide at least partially over the first doped region, one of the doped regions comprising a source region and the other doped region comprising a drain region;

(b) a light source in optical communication with an input end of the optical waveguide for directing a lightwave thereto; and (c) an electronic device electrically coupled to the source and drain regions for receiving and processing an electrical signal generated in the photodetector.

* * * * *